(12) United States Patent
Haas et al.

(10) Patent No.: US 7,836,356 B2
(45) Date of Patent: Nov. 16, 2010

(54) METHOD FOR MONITORING DEPENDENT METRIC STREAMS FOR ANOMALIES

(75) Inventors: Peter J. Haas, San Jose, CA (US); John M. Lake, Cary, NC (US); Guy M. Lohman, San Jose, CA (US); Ashutosh Singh, San Jose, CA (US); Tanveer F. Syeda-Mahmood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 12/110,851

(22) Filed: Apr. 28, 2008

(65) Prior Publication Data

US 2009/0271664 A1  Oct. 29, 2009

(51) Int. Cl.
G06F 11/00 (2006.01)
(52) U.S. Cl. .......................................................... 714/47
(58) Field of Classification Search ................... 714/48, 714/47; 702/179, 182, 181
See application file for complete search history.

(56) References Cited

U.S. PATENT DOCUMENTS

| | | | | |
|---|---|---|---|---|
| 6,526,025 B1 * | 2/2003 | Pack | ........................... | 370/252 |
| 6,735,553 B1 * | 5/2004 | Frogner et al. | .............. | 702/186 |
| 6,968,047 B1 * | 11/2005 | Shellum et al. | ........ | 379/112.07 |

(Continued)

OTHER PUBLICATIONS

Markou, et al., "Novelty Detection: A Review—Part 1: Statistical Approaches", Elsevier Signal Processing, 2003, pp. 2481-2497; Department of Computer Science, PANN Research, Univerisity of Exeter, Exeter EX4 4PT, UK.

(Continued)

*Primary Examiner*—Bryce P Bonzo
*Assistant Examiner*—Amine Riad
(74) *Attorney, Agent, or Firm*—Cantor Colburn LLP; Brian Lambert (57) ABSTRACT

A method for monitoring dependent metric streams for anomalies including identifying a plurality of sets of dependent metric streams from a plurality of metric streams of a computer system by measuring an association of the plurality of metric streams using a statistical dependency measure analysis, wherein each set includes a plurality of the dependent metric streams and each metric stream includes a plurality of data, determining a subset of the plurality of sets of dependent metric streams to monitor by selecting a quantity of the sets of dependent metric streams that have a highest statistical dependency, cleaning the data of each set of dependent metric streams of the subset by identifying and removing outlier data, fitting a probability density function to the cleaned data of each set of dependent metric streams of the subset, wherein the probability density function is a likelihood function that provides a likelihood of an occurrence of the cleaned data, determining a detection threshold that is a lower threshold on the likelihood of the occurrence of the cleaned data of each set of dependent metric streams of the subset based on the likelihood function, detecting an anomaly if a likelihood of an occurrence of a new data of one of the sets of dependent metric streams of the subset is less than the detection threshold, and transmitting an alert signal in response to detecting the anomaly.

5 Claims, 5 Drawing Sheets

U.S. PATENT DOCUMENTS

| | | | |
|---|---|---|---|
| 7,006,947 B2* | 2/2006 | Tryon et al. | 702/183 |
| 7,076,397 B2* | 7/2006 | Ding et al. | 702/182 |
| 7,593,833 B2* | 9/2009 | Savoor et al. | 702/186 |
| 7,669,087 B1* | 2/2010 | Johnsen et al. | 714/47 |
| 2003/0110007 A1* | 6/2003 | McGee et al. | 702/179 |
| 2004/0133395 A1* | 7/2004 | Ding et al. | 702/182 |
| 2006/0036729 A1* | 2/2006 | Sakaguchi et al. | 709/224 |
| 2007/0265713 A1* | 11/2007 | Veillette et al. | 700/30 |
| 2008/0256397 A1* | 10/2008 | Smith | 714/47 |

OTHER PUBLICATIONS

Papadimitriou, et al., "Streaming Pattern Discovery in Multiple Time-Series", Computer Science Department, Carnegie Mellon University, Pittsburgh, PA, USA, pp. 697-708.

Breitgand, et al., "Automated and Adaptive Threshold Setting: Enabling Technology for Autonomy and Self-Management", IBM Haifa Research Lab Haifa University Campus, mount Carmel, Haifa, Isreal 31905, pp. 1-12.

* cited by examiner

METHOD FOR MONITORING DEPENDENT METRIC STREAMS FOR ANOMALIES

BACKGROUND OF THE INVENTION

1. Field of the Invention

This invention relates generally to computer systems management, and particularly to a method for monitoring dependent metric streams for anomalies.

2. Description of Background

As the complexity of computer systems continues to increase, an increased challenge arises to effectively monitor the performance of such systems to detect problems in a timely manner (e.g., before significant consequences occur). System monitoring techniques have been used to address this challenge by specifying and tracking large sets of performance measurement data (or "metric streams"). For example, each metric stream includes values over time of a performance measurement that corresponds to a specified computer software or hardware component, such as the utilization of memory or the transmission of data. An upper and/or lower threshold value is specified for each metric stream, and an abnormality (or "anomaly") is detected when one or more values in a metric stream violate (e.g., meet or exceed) a corresponding threshold value.

Some metric streams are related or dependent on other metric streams. For example, in a system where data is transmitted from a first component to a second component, the metric stream for data transmitted by the first component and the metric stream for data received by the second component are dependent metric streams. Current system monitoring techniques monitor metric streams independently (e.g., individually, in isolation of other streams) for anomalies, and dependent metric streams that correspond to a monitored metric stream are considered redundant and ignored. However, many system performance problems are not detectable by monitoring metric streams independent of corresponding dependent metric streams. Therefore, a technique for monitoring two or more dependent metric streams for anomalies is desirable.

SUMMARY OF THE INVENTION

A method for monitoring dependent metric streams for anomalies is provided. An exemplary embodiment of the method includes identifying a plurality of sets of dependent metric streams from a plurality of metric streams of a computer system by measuring an association of the plurality of metric streams using a statistical dependency measure analysis, wherein each set includes a plurality of the dependent metric streams and each metric stream includes a plurality of data, determining a subset of the plurality of sets of dependent metric streams to monitor by selecting a quantity of the sets of dependent metric streams that have a highest statistical dependency, cleaning the data of each set of dependent metric streams of the subset by identifying and removing outlier data, fitting a probability density function to the cleaned data of each set of dependent metric streams of the subset, wherein the probability density function is a likelihood function that provides a likelihood of an occurrence of the cleaned data, determining a detection threshold that is a lower threshold on the likelihood of the occurrence of the cleaned data of each set of dependent metric streams of the subset based on the likelihood function, detecting an anomaly if a likelihood of an occurrence of a new data of one of the sets of dependent metric streams of the subset is less than the detection threshold, and transmitting an alert signal in response to detecting the anomaly.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

According to exemplary embodiments of the invention described herein, a method for monitoring dependent metric streams for anomalies is provided. In accordance with such exemplary embodiments, a technique for monitoring two or more dependent metric streams for anomalies is provided. This technique reduces the task of monitoring a stream of multivariate values to the task of monitoring a stream of univariate likelihood values. However, the technique also provides improved anomaly detection in monitoring of individual metric streams.

Figure 1:
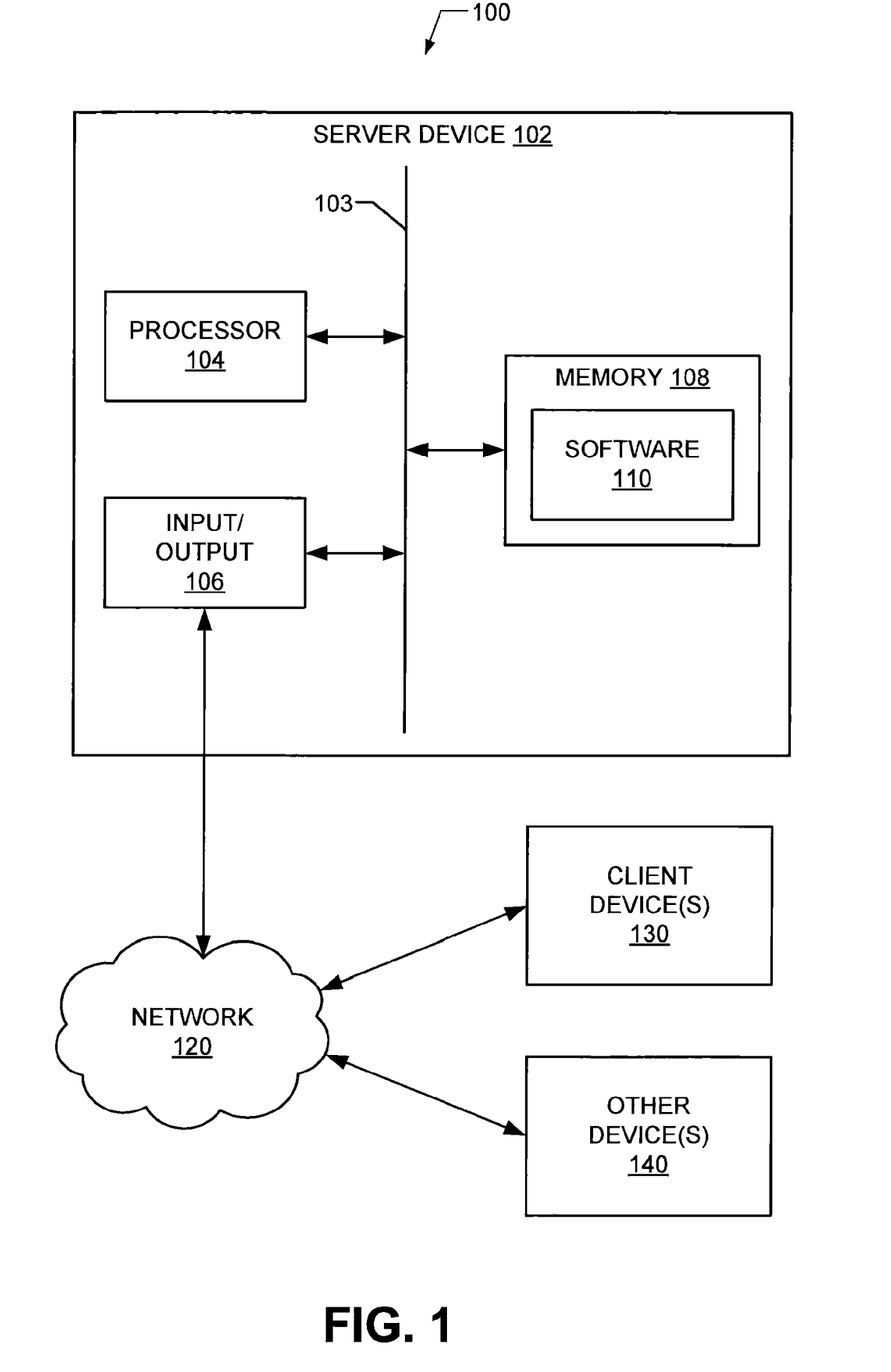
FIG. 1 is a block diagram illustrating an example of a computer system including an exemplary computing device configured for monitoring dependent metric streams for anomalies.

Turning now to the drawings in greater detail, wherein like reference numerals indicate like elements, FIG. 1 illustrates an example of a computer system 100 including an exemplary computing device ("server device" or "server") 102 configured for monitoring dependent metric streams for anomalies. In addition to server device 102, exemplary computer system 100 includes network 120, client device(s) 130, and other device(s) 140. Network 120 connects server device 102, client device(s) 130, and other device(s) 140 and may include one or more wide area networks (WANs) and/or local area networks (LANs) such as the Internet, intranet(s), and/or wireless communications network(s). Client device(s) 130 may include one or more other computing devices, e.g., that are similar to server device 102. Other device(s) 140 may include one or more other computing devices, e.g., one or more other server devices, storage devices, etc. Server device 102, client device(s) 130, and other device(s) 140 are in communication via network 120, e.g., to communicate data between them.

Exemplary server device 102 includes processor 104, input/output component(s) 106, and memory 108, which are in communication via bus 103. Processor 104 may include multiple (e.g., two or more) processors, which may, e.g., implement pipeline processing, and may also include cache memory ("cache") and controls (not depicted). The cache may include multiple cache levels (e.g., L1, L2, etc.) that are on or off-chip from processor 104 (e.g., an L1 cache may be on-chip, an L2 cache may be off-chip, etc.). Input/output component(s) 106 may include one or more components that facilitate local and/or remote input/output operations to/from server device 102, such as a display, keyboard, modem, network adapter, ports, etc. (not depicted). Memory 108 includes software 110 for monitoring dependent metric streams for anomalies, which is executable, e.g., by server device 102 via processor 104. Memory 108 may include other software, data etc. (not depicted).

Figure 2:
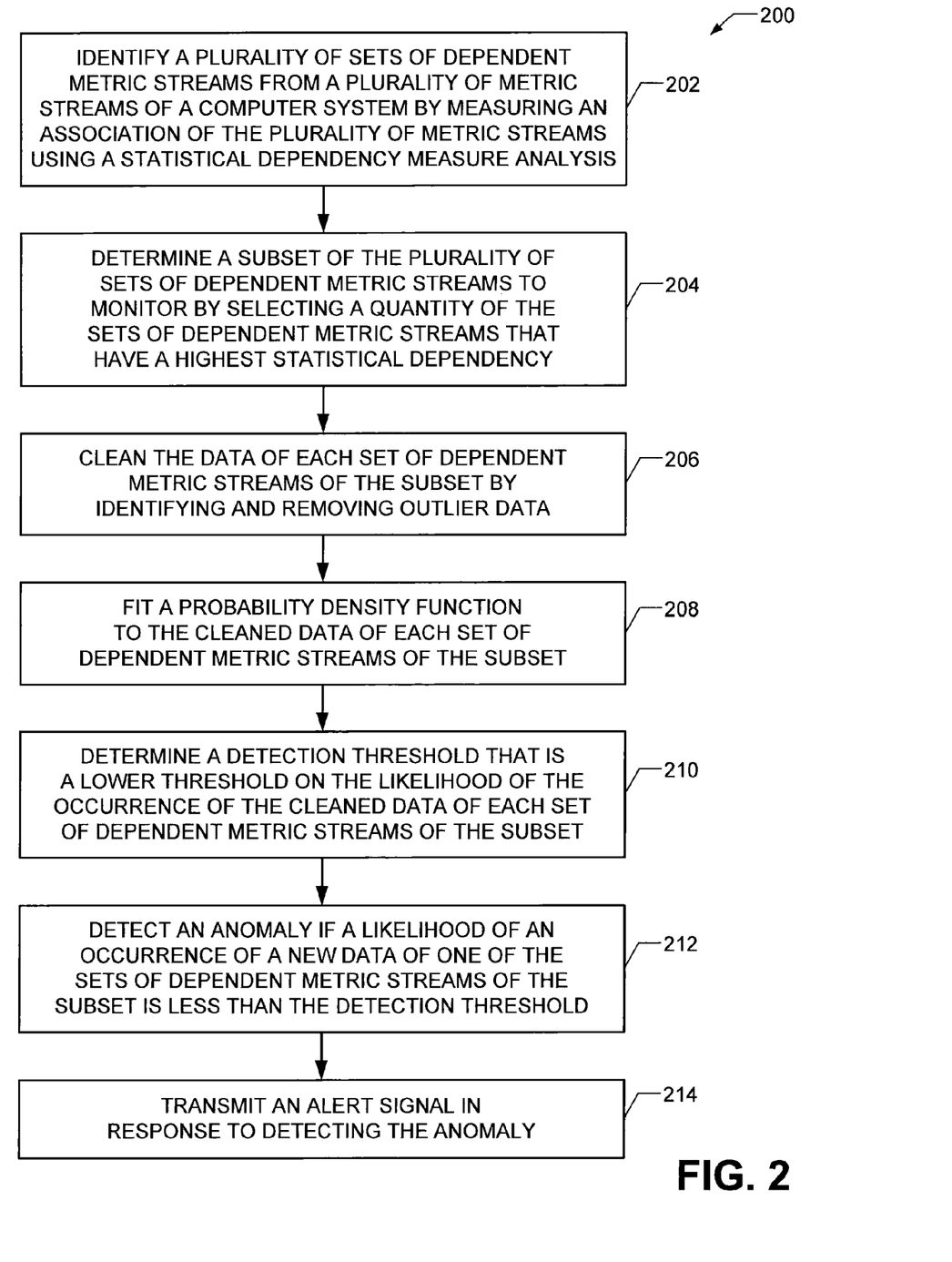
FIG. 2 is a flow diagram illustrating an example of a method for monitoring dependent metric streams for anomalies, which is executable, for example, on the exemplary computing device of FIG. 1.

FIG. 2 illustrates an example of a method 200 for monitoring dependent metric streams for anomalies, which is executable, for example, on the exemplary server device 102 of FIG. 1 (e.g., as a computer program product). In block 202, a plurality of sets of dependent metric streams are identified from a plurality of metric streams of a computer system (e.g., computer system 100) by measuring an association of the plurality of metric streams using a statistical dependency measure analysis, where each set includes a plurality of the dependent metric streams and each metric stream comprises a plurality of data. For example, in some exemplary embodiments, a measure of an association $\phi$ between metric-stream training data is used to identify likely candidate pairs for monitoring, via a ranking process. To facilitate fast screening, since the number of candidate pairs to be examined is potentially large, the computation of the association $\phi$ is made on "lag-0" dependencies, i.e., on dependencies between metric values observed at the same point in time. Even under this condition, there are many possible choices of the association $\phi$. The association $\phi$ between streams can be measured using a mean-square contingency distance analysis ("MSCD"). The MSCD is the same or similar to the statistic measure used in a chi-squared test for independence. Although the MSCD is described for use, other measures of association can be applied.

For each stream $m_i$, Q bins are defined by using the training data to compute Q quantiles. Based on experimentation, Q=5 or some other small value can be sufficient. For example, with Q=4, sort the N values $m_i(t_1), m_i(t_2), \ldots, m_i(t_N)$ as $v_1 \leq v_2 \leq \ldots \leq v_N$, and take the boundaries of the first bin as $(-\infty, v_j]$ with j=0.25N, the boundaries of the second bin as $(v_j, v_k]$ with k=0.5N, and similarly for the remaining two bins. For each metric-stream pair $(m_i, m_j)$, the cross-product of the two corresponding sets of bins defines $Q^2$ cells, each cell corresponding to a rectangular region in the space of possible $(m_i, m_j)$ values. Compute a Q×Q contingency table $T_{ij}$ by counting the number of training points that fall in each cell. For example, when processing the nth tuple with $m_i(t_n)$ lying in bin 2 and $m_j(t_n)$ lying in bin 3, increment the counter for cell (2,3) by 1. Then set:

$$\phi^2 = \frac{1}{Q-1} \sum_{r=1}^{Q} \sum_{s=1}^{Q} \frac{(\pi_{rs} - \pi_{r.}\pi_{.s})^2}{\pi_{r.}\pi_{.s}}$$

Here $\pi_{rs}$ is the count in cell (r,s) of $T_{ij}$, divided by N, and the quantities $\pi_{r.}$ and $\pi_{.s}$ denote marginal totals: $\pi_{r.} = \Sigma_s \pi_{rs}$ and $\pi_{.s} = \Sigma_r \pi_{rs}$, and $0 \leq \phi^2 \leq 1$. The case $\phi^2 = 0$ corresponds to the "independence" scenario in which the joint frequency distribution for the cell counts factors into a product of marginal distributions: $\pi_{rs} = \pi_{r.}\pi_{.s}$ for all r and s. The case $\phi^2 = 1$ corresponds to the case in which one metric value is completely determined by the other (up to the resolution of the bin counts). The training data can be stored in a relational database, and the MSCD for a metric-stream pair can be computed within the database using a SQL query that employs an outer join to compute the contingency-table entries.

In some exemplary embodiments, the metric pairs to be jointly monitored may be identified by semantic rules provided, e.g., by a user, or by syntactic rules applied to the metric-stream names. Alternately, the metric pairs to be jointly monitored may be identified by exploiting products that automatically discover system structure or by exploiting methods for discovering metric streams that strongly impact quality of service.

In block 204, a subset of the plurality of sets of dependent metric streams to monitor is determined by selecting a quantity of the sets of dependent metric streams that have a highest statistical dependency. For example, with respect to the foregoing exemplary description for block 202, the pairs $(m_i, m_j)$ are sorted by decreasing $\phi^2$ values. In a basic approach, the top L pairs are retained, where L is the largest number of pairs that a monitoring system can support within memory and CPU constraints (e.g., with respect to server 102). For each pair $(m_i, m_j)$ that is retained, the likelihood-data array is stored. However, when $\phi^2$ is very close to 1, the two metric streams are often measuring the same or substantially similar quantity such that no additional benefit is gained by monitoring both streams instead of just one. For example, one metric stream may be recording a subset of the values in the other stream, or the two metrics being measured may correspond to components that are so tightly coupled that their dependency structure will not change. Therefore, in an alternate approach, the top L pairs are retained after eliminating all pairs such that $\phi^2 \geq \phi_{max}^2$, where $\phi_{max}^2$ is an upper cutoff value. Based on experimentation, $\phi^2 = 0.95$ can be a sufficient upper cutoff value.

If the amount of training data is very large, so that a full scan of all training points is "expensive" (e.g., needing significant computation, processing, etc.), then the screening procedure can potentially be speeded up by a "pre-screening" step in which sampled data from each stream is used to quickly test whether $\phi^2 \geq \epsilon$, where $\epsilon$ is a cutoff value. The metric-stream pairs that pass the test are subjected to further analysis. The test is of the form $\hat{\phi}^2 \geq u$, where $\hat{\phi}^2$ is the value of the MSCD based on the sample data, and u is chosen so that the worst-case probability of incorrectly assuming that $\phi^2 \geq \epsilon$ is smaller than a prespecified value p, where "worst-case" refers to the scenario in which $\phi^2 = \epsilon$, so that the inequality "barely holds." The sample size is then chosen to ensure that the probability of correctly concluding that $\phi^2 \geq \epsilon$ (when, in fact, $\phi^2$ is "sufficiently" larger than $\epsilon$) exceeds 1−p. The parameters u and $\epsilon$, along with the sample size, may be chosen according to known techniques.

In some exemplary embodiments, the data of each set of dependent metric streams of the subset is normalized. For example, from the training data processed as described above a set $D_{ij}'=\{(x_l,y_l):1\leq l\leq n\}$ of normalized observations is computed, where:

$$x_l = \frac{m_i(t_l) - c_i^{min}}{c_i^{max} - c_i^{min}}$$

and $$y_l = \frac{m_j(t_l) - c_j^{min}}{c_j^{max} - c_j^{min}}$$

The constants $c_q^{min}$ and $c_q^{max}$ are chosen to bracket the values in stream $m_q$ ($1\leq q\leq k$).

In block 206, the data of each set of dependent metric streams of the subset is cleaned by identifying and removing outlier data. For example, in some exemplary embodiments, the data is clustered using a hierarchical method that is based on the concept of perceptual grouping. Any points that lie in very small clusters are identified as outliers. The clustering algorithm may also have the property that the number of clusters is determined automatically, helping ensure that the cleaning procedure adapts readily to the specific structure of each set of training data. A first aspect of the clustering algorithm is to search for clusters by viewing the set of training points as an "image" and examining this image at multiple resolutions. The "pixels" of the image correspond to subregions of the unit square as demarcated by a square grid; the finer the grid, the higher the "resolution." A pixel corresponding to a subregion is "on" if there is at least one training point within the subregion. To start, small clusters are identified at a fine resolution, and the resolution is sequentially coarsened, combining previously identified smaller clusters into larger clusters, if appropriate. A second aspect of the clustering algorithm is to combine clusters upon satisfaction of perceptual-grouping criteria related to proximity, continuity of orientation, and density. A third aspect of the clustering algorithm is to determine the clustering hierarchy, as well as the appropriate level of clustering to use for data cleaning, by identifying salient points on the curve that represents the number of clusters as a function of the degree of resolution.

For the first aspect of the clustering algorithm, a metric-stream pair $(m_i,m_j)$ is fixed and it is supposed that the set $D_{ij}'$ of normalized (but dirty) training points comprises $N>1$ pairs $(x_1,y_1),(x_2,y_2),\ldots,(x_N,y_N)$, that lie in the unit square. Each resolution level $L_K$ corresponds to a partitioning of the unit square into $L_K^2$ subregions or bins, where each subregion is square and has edge length $1/L_K$. Bin (r,s) has its lower left corner located at the point $(r/L_K,s/L_K)$ for $0\leq r,s\leq L_K-1$. Each training point $(x_l,y_l)$ has an associated pair of bin coordinates $(x_l^k,y_l^k)$ that specifies the bin in which the point lies at level $L_K$. If $L_K=10$, for example, then the bin coordinates of point $(x_l,y_l)=(0.05,0.62)$ are $(x_l^k,y_l^k)=(0,6)$. Thus, $L_1$ represents the coarsest resolution level, in which the training points all reside in a single 1×1 bin; as k increases, the resolution becomes increasingly fine. A logarithmic sampling scheme is used, such as the following: $L_1=1$ and $L_K=2L_{K-1}$ for k=2, 3, . . . ,K. Here, K is determined approximately as $-\log_2 d$, where d is the minimum distance between any two training points. In practice, it suffices to take d as the 0.01 percentile of the set of all pairwise distances, thereby reducing K and hence the cost of the clustering algorithm. Based on experimentation, logarithmic sampling with the latter choice of d yields results that are acceptably close to those obtained using more expensive uniform or percentile-based schemes.

For the second aspect of the clustering algorithm, for $k\in\{1, 2,\ldots,K\}$, the number of clusters produced at level $L_K$ by the hierarchical algorithm is denoted by n(k). To produce these n(k) clusters, the set of n(k+1) "incoming" clusters $(C^{K+1}=\{c_1^{K+1},c_2^{K+1},\ldots,c_{n(K+1)}^{K+1}\}$ produced at level $L_{K+1}$ is considered and these clusters are grouped (i.e., merged) if a set of perceptual grouping constraints are satisfied. To start the process at level K, the incoming clusters are taken as the N singleton clusters that correspond to the original training points. The algorithm uses a connected-component algorithm that is implemented using the Union-Find data structure. This procedure examines each cluster pair $(c_r^{k+1},c_s^{k+1})$ with r<s and groups the two clusters if the following perceptual grouping constraints are satisfied: 1) Proximity constraint: at least one level-$L_K$ bin is occupied by a point of $C_r^{k+1}$ that is "adjacent" to a level-$L_K$ bin occupied by a point of $c_s^{k+1}$; formally, there exists $(x_l,y_l)\in c_r^{k+1}$ and $(x_m,y_m)\in c_s^{k+1}$ such that max $(|x_l^k-x_m^k|,|y_l^k-y_m^k|)\leq 1$; 2) Density constraint: the average density of $c_r^{k+1}$ and $c_s^{k+1}$ are similar; denoting by $|c|$ the number of points in cluster c and by $N_b^k(c)$ the number of level-$L_K$ bins that contain at least one point of cluster c, where $\epsilon$ is an algorithm parameter, this constraint can be stated as:

$$\left|\frac{|c_r^{k+1}|}{N_b^k(c_r^{k+1})} - \frac{|c_s^{k+1}|}{N_b^k(c_s^{k+1})}\right| \leq \varepsilon;$$

3) Orientation constraint: clusters $C_r^{k+1}$ and $c_s^{k+1}$ are oriented in approximately the same direction; the orientation v(c) of a cluster $c=\{(x_1,y_1),(x_2,y_2),\ldots,(x_m,y_m)\}$ is taken as the normalized eigenvector corresponding to the largest eigenvalue of the matrix $Z^tZ$, where $A^t$ denotes the transpose of a matrix A and Z is the m×2 matrix with entries $Z(i,1)=x_i$ and $Z(i,2)=y_i$; with these definitions, and with $\rho\in(0,1)$, an algorithmic parameter, the orientation constraint can be stated as:

$$1-|v(c_r^{k+1})^t v(c_r^{k+1})|\leq \rho.$$

It is noted that the quantity on the left of the foregoing equation corresponds to the magnitude of the sine of the angle between the orientation vectors. The parameters $\epsilon$ and $\rho$, which are used to specify the density and orientation constraints, can be fixed constants that do not depend on the data. Values can be used that are recommended by researchers in cartography, who have performed psychophysical studies on the perception of spatial dispersion in point sets. Such studies indicate that a 30% difference in density or a 20 degree difference in orientation are appropriate minimum values to distinguish between two regions.

For the third aspect of the clustering algorithm, clusters identified in the foregoing description can be used to remove suspicious training data. The goal is to identify an appropriate clustering level and then, at that level, discard clusters containing less than $\alpha$ points. In experimentation $\alpha=2$ was set and, thus, all singleton clusters were discarded. However, in an alternative approach, for example, $\alpha$ may be expressed as a percentage of the number of training points. To identify the appropriate clustering level, a set of "salient" resolution levels from among the candidates $L_1,L_2,\ldots,L_K$ is first identified. In this regard, a smooth curve is fitted to the data points $(L_1,n(1)),(L_2,n(2)),\ldots,(L_K,n(K))$, thereby approximating the functional dependency of the number of clusters on the resolution level. The interesting clustering levels are defined as those levels corresponding to "salient points" of the curve, defined here as those points at which the second derivative changes sign. Denoting the resulting interesting clustering levels as $L_{j_1}, L_{j_2}, \ldots, L_{j_M}$ for some $M \geq 2$, the appropriate level of clustering (for the purpose of cleaning the training data) is defined as $L_{j_1}$, i.e., the coarsest "salient" level of clustering. At this coarse level, it is difficult for the algorithm to produce very small clusters and, thus, any very small clusters that are nonetheless produced are likely to be true outliers.

The clustering algorithm is further described in U.S. application Ser. No. 11/970,946, filed Jan. 8, 2008, entitled "Method and System for Finding Structures in Multidimensional Spaces Using Image-Guided Clustering", and assigned to the assignee of the present application, the contents of which are incorporated herein by reference in their entirety.

In block 208, a probability density function is fit to the cleaned data of each set of dependent metric streams of the subset, where the probability density function is a likelihood function that provides a likelihood of an occurrence of the cleaned data. For example, in some exemplary embodiments, a probability density function $f$ is fit to the set $D_{ij}$ of normalized and cleaned training points described above. The function $f$ is considered a "likelihood" function because $f(m_1, m_2)$ can be roughly interpreted as the likelihood of seeing the metric-value pair $(m_1, m_2)$ based on historical data.

In some exemplary embodiments, the probability density function is fit to the data using kernel density ("KD") estimation. The general form of a d-dimensional axis-aligned KD estimator based on (cleaned) training points $x_1, x_2, \ldots, x_n$ is:

$$f(u) = \frac{1}{n h_1 h_2 \ldots h_d} \sum_{i=1}^{n} K\left(\frac{u_1 - x_{i1}}{h_1}, \frac{u_2 - x_{i2}}{h_2}, \ldots, \frac{u_d - x_{id}}{h_d}\right),$$

where the function K is the kernel and the smoothing parameter $\theta = (h_1, h_2, \ldots, h_d)$ is the vector of bandwidths for the d dimensions. In general, $\theta$ can be a function of the data. Each training point $x_i$ influences the value of $f$ at a given point x. The kernel K determines the shape of the "influence function" and the bandwidths determine how quickly the influence of $x_i$ dies off with increasing distance; the smaller the value of h, the more rapidly the influence dies off.

In some exemplary embodiments, clustering techniques are used to obtain a spatially varying bandwidth function that adapts to the local geometry of the training points. For example, if M clusters $c_1, c_2, \ldots, c_M$ are identified, then for $m=1, 2, \ldots, M$, a density function $f_m$ is fit to the training points in the mth cluster. If each cluster is small and roughly ovoid in shape, then a constant bandwidth in each dimension suffices for the fit, reducing complexity. The final density estimate $f$ is obtained as a weighted average of $f_1, f_2, \ldots, f_m$, where the weight of $f_m$ is the fraction of the training points that belong to $c_m$. It has been found empirically that the Partitioning-Around-Medoid ("PAM") algorithm suits the KD estimation task provided that a large enough number of clusters are used with respect to the data characteristics. To overcome the need to specify the number of clusters for the PAM algorithm, the results of the hierarchical clustering algorithm (e.g., used during data cleaning) are used to guide in setting the target number of PAM clusters. If the hierarchical algorithm detects c clusters in the training data (e.g., ignoring those clusters labeled as "dirty"), then the target number of PAM clusters is set as $\max(\alpha_0, \alpha_1 c)$, where $\alpha_1 > 1$. In experimentation, the choice of $\alpha_0 = 10$ and $\alpha_1 = 2$ were found to work acceptably, and the overall results were relatively insensitive to the choice of these parameters, as long as $a_0$ was not chosen too small. If computing resources are very limited, an upper bound can also be imposed on M.

When fitting a bivariate density $f_m$ to the mth cluster, a "product form" Gaussian kernel is used that computes the influence of each training point along the x and y directions independently using respective axis-aligned bandwidths $h_{m,1}$ and $h_{m,2}$, thus expressed as:

$$f_m(u, v) = \frac{1}{|c_m|} \sum_{(x,y) \in c_m} \frac{1}{h_{m,1} h_{m,2}} K_G\left(\frac{u-x}{h_{m,1}}\right) K_G\left(\frac{v-y}{h_{m,2}}\right)$$

and $$f(u, v) = \sum_{m=1}^{M} \frac{|c_m|}{|D_{ij}|} f_m(u, v)$$

for $(u,v) \in [0,1]^2$. The following bandwidth formula can be used:

$$h_{m,i} = 1.06 |c_m|^{-1/5} \min(\sigma_{m,i}, IQR_{m,i}/1.34)$$

for $i=1, 2$ where $\sigma_{m,1}$ and $IQR_{m,1}$ are the standard deviation and interquartile range, respectively, of the points $\{x:(x,y) \in c_m\}$, and $\sigma_{m,2}$ and $IQR_{m,2}$ are the corresponding quantities for the points $\{y:(x,y) \in c_m\}$.

In some exemplary embodiments, cleaned data is "jittered," prior to fitting a probability density function to the data, in order to avoid overfitting the density function when the n training points represent a small sample of possible metric values. The jittering technique is defined as follows. Replace each training point $(x_i, y_i)$ by $((1+U_i)x_i, (1+V_i)y_i)$, where $\{U_i, V_i: 1 \leq i \leq n\}$ are mutually independent random variables uniformly distributed on $[-\beta, \beta]$ for some $\beta \in (0,1)$. Fit a density function $f$ to the jittered data using the techniques described above. Independently repeat this exercise N times, and average the resulting N fitted density functions together to obtain the final density estimate. In experimentation, $\beta = 0.05$ was found to be an acceptable option. Similarly, jittering may be applied when fitting each density function $f_m$, and then the final density function $f$ may be obtained as a weighted average of the jittered $f_m$ functions. Thus, a probability density function can be fit to each cluster using jittering and kernel density estimation with data-dependent bandwidths.

In block 210, a detection threshold is determined that is a lower threshold on the likelihood of the occurrence of the cleaned data of each set of dependent metric streams of the subset based on the likelihood function. For example, the training data is used to set a lower threshold $\tau_{ij}$ on the likelihood of an observed pair $(m_i(t), m_j(t))$. In some exemplary embodiments, the detection threshold is a minimum of the likelihood of the occurrence of the cleaned data of each set of dependent metric streams of the subset based on the likelihood function. For example, the likelihood threshold $\tau_{ij}$ is computed as:

$$\tau_{ij} = \min_{(x,y) \in D_{ij}} f_0(x, y)$$

In this computation, $f_0$ is the KD function that is fitted to the original training points without any jittering. Thus, the threshold is defined as the least likely of the observed training points. The KD estimator is used based on jittering to compute the likelihoods for the monitored observations, which has the effect of extrapolating the "normal" region slightly beyond the boundaries defined by the original training data. That is, if a monitored metric-pair value is very close to a training point, even the least likely of the training points according to $f_0$, then the monitored pair will not trigger an alert. This helps to avoid overfitting the dependency anomaly function to the training data and to avoid false positives.

In block 212, an anomaly is detected if a likelihood of an occurrence of a new data of one of the sets of dependent metric streams of the subset is less than the detection threshold. For example, during the monitoring phase, the likelihood of each observed metric pair is computed, and an observed pair with a likelihood below $\tau_{ij}$ (as discussed above) will cause an alert to be raised. To facilitate rapid evaluation of $f$ (since the arrival rate of observations can be very high), in some exemplary embodiments, $f$ is pre-computed on an L×L grid $G=\{(u_r,v_s):1 \leq r,s \leq L\}$ during the off-line training phase, where $u_r=(r-1)/(L-1)$ and $v_s=(s-1)/(L-1)$. Then, during monitoring, the likelihood of an arbitrary point $(u,v) \in [0,1]^2$ is computed using bilinear interpolation. Thus, for a point $(x,y)$ such that $u_r \leq x \leq u_{r+1}$ and $v_s \leq y \leq v_{s+1}$ for some $r,s \in \{1, 2, \ldots, L\}$, the following is set:

$$f(x, y) = (1-a)(1-b)f(u_{r,s}) +$$
$$a(1-b)f(u_{r+1,s}) + (1-a)bf(u_{r,s+1}) + abf(u_{r+1,s+1}),$$

where $$a = \frac{x - u_r}{u_{r+1} - u_r}$$

and $$b = \frac{y - v_s}{v_{s+1} - v_s}.$$

Each new observation $(m_i(t),m_j(t))$ is first normalized to a pair $(x_t,y_t)$ (e.g., as described above for step 204), and then an alert is triggered if $f(x_t,y_t) < \tau_{ij}$, where $f$ is computed via interpolation as described above.

In block 214, an alert signal is transmitted (e.g., via server 102) in response to detecting an anomaly. In some exemplary embodiments, an alert signal is transmitted if a plurality of likelihoods of occurrences of new data of one of the sets of dependent metric streams of the subset is less than the detection threshold, indicating a detection of a persistent anomaly in accordance with a predetermined occurrence pattern. For example, an alert can be triggered when the threshold is "persistently" exceeded, such as when the threshold is exceeded repeatedly in accordance with a specified pattern. Thus, if at a time instant $t_l$, there is an occurrence "O" if the likelihood of the observation $(m_i(t_l),m_j(t_l))$ is below the threshold $\tau_{ij}$ (i.e., an anomaly is detected), and there is a hole "H" at time instant $t_l$ otherwise (i.e., an anomaly is not detected), for a pattern specification of O=3 and H=1, an alert is triggered if three occurrences occur with each occurrence separated by one hole at most. For example, the anomaly detection patterns OOO, OHOHO, and OOHO would trigger an alert, while the pattern OHOHHO would not.

With respect to the foregoing descriptions, and exemplary embodiments of the invention in general, it should be understood that although examples are presented in terms of dependent metric stream pairs (e.g., bivariate monitoring), these examples apply to a plurality (e.g., two or more) dependent metric streams (e.g., multivariate monitoring). For example, KD estimation scales feasibly with increasing dimensions. Also, as discussed above, exemplary embodiments of the invention can also be applied to monitoring of individual metric streams to provide improved anomaly detection.

Figure 3:
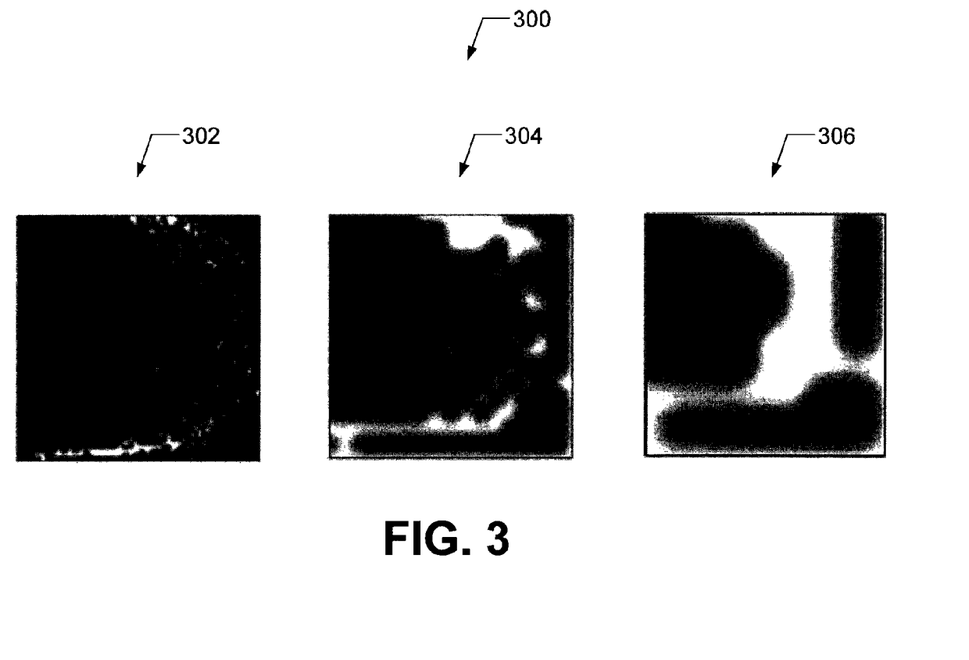
FIG. 3 is a series of images illustrating dependent metric stream data at various resolutions, for example, in accordance with the method of FIG. 2.
Figure 4:
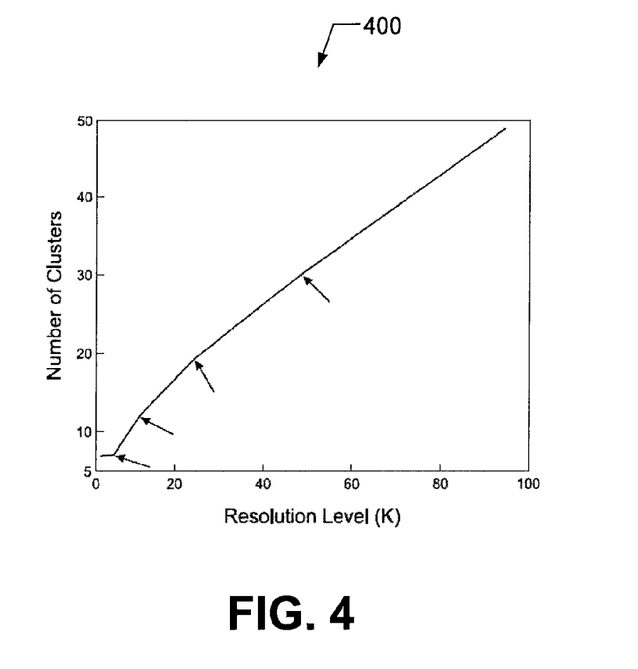
FIG. 4 is a graph illustrating a curve that represents the number of clusters of dependent metric stream data as a function of the degree of resolution, for example, in accordance with the method of FIG. 2.

FIG. 3 is a series of images 300 illustrating dependent metric stream data at various resolutions, for example, in accordance with block 206 of FIG. 2. The images 300 include a fine resolution image 302, a medium resolution image 304, and a coarse resolution image 306, where each image is progressively coarser. FIG. 4 is a graph 400 illustrating a curve that represents the number of clusters of dependent metric stream data as a function of the degree of resolution, for example, in accordance with block 206 of FIG. 2. The interesting clustering levels, as discussed above, are identified in graph 400 by arrows pointing to salient points of the curve.

Figure 5:
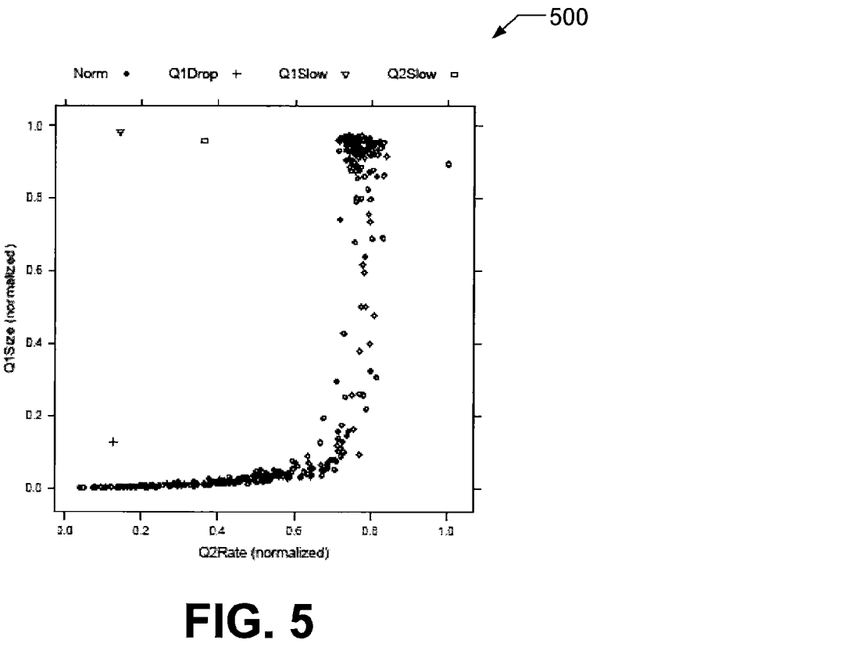
FIG. 5 is a graph illustrating raw dependent metric stream data, for example, in accordance with the method of FIG. 2.
Figure 6:
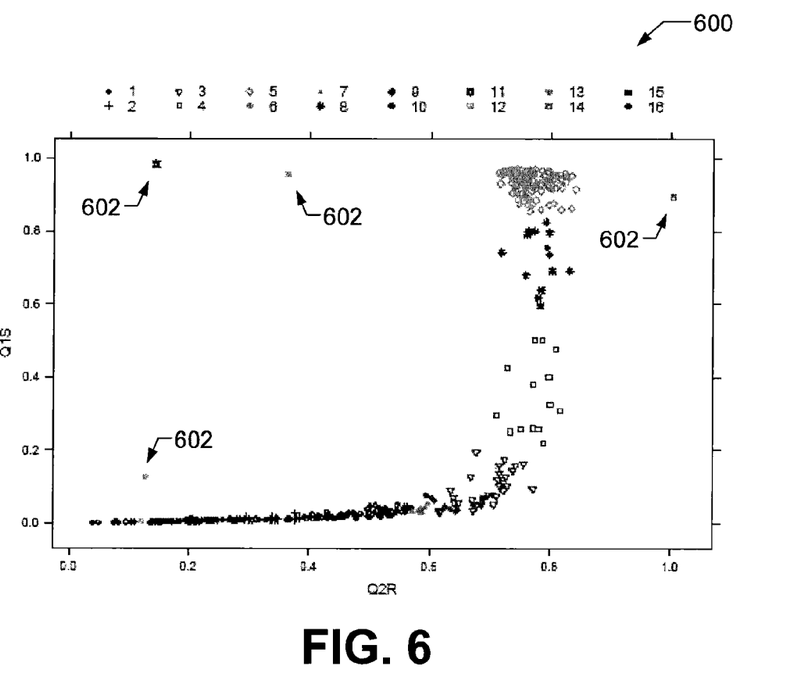
FIG. 6 is a graph illustrating clustered dependent metric stream data, for example, of the raw dependent metric stream data of FIG. 5, in accordance with the method of FIG. 2.
Figure 7:
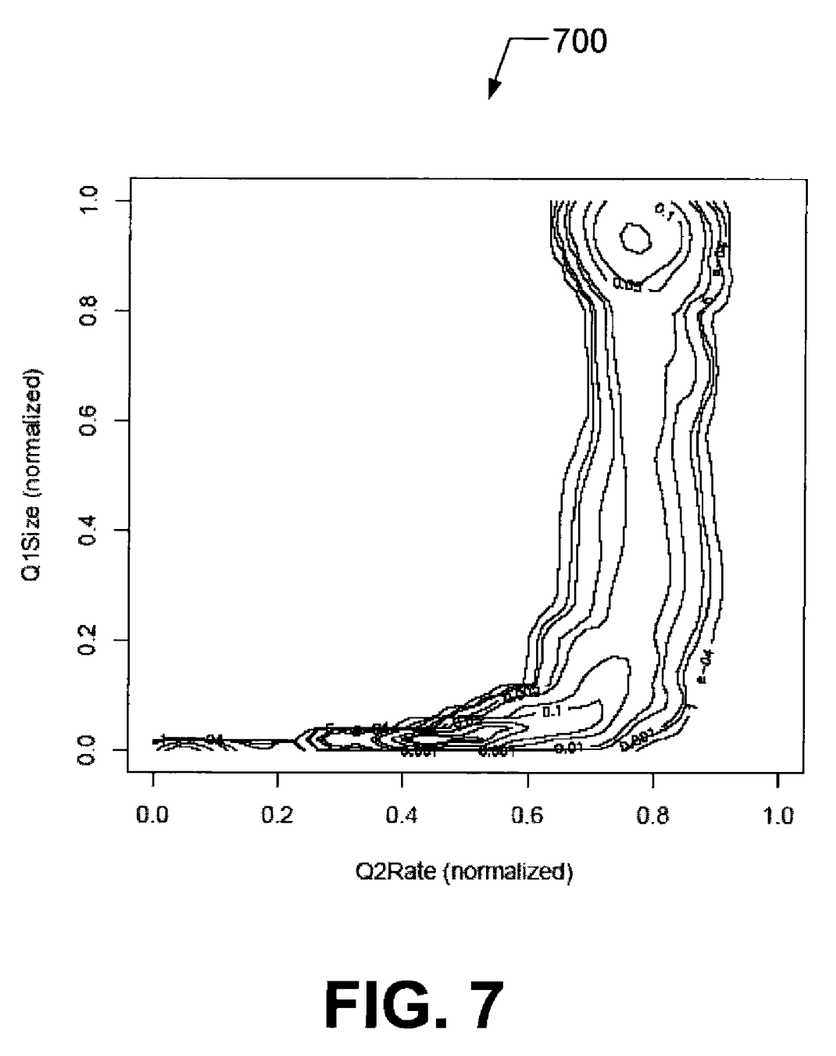
FIG. 7 is a graph illustrating a probability density function fitted to clustered dependent metric stream data, for example, of FIG. 6, in accordance with the method of FIG. 2.

FIG. 5 is a graph 500 illustrating raw dependent metric stream data, for example, in accordance with blocks 202 and 204 of FIG. 2. FIG. 6 is a graph 600 illustrating clustered dependent metric stream data, for example, of the raw dependent metric stream data of FIG. 5, in accordance with block 206 of FIG. 2. Graph 600 includes four apparent data outliers 602. FIG. 7 is a graph 700 illustrating a probability density function fitted to clustered dependent metric stream data, for example, of FIG. 6, in accordance with the method of FIG. 2. FIGS. 5, 6, and 7 illustrate normalized data graphed in a unit square.

Exemplary computer system 100 and server device 102 are illustrated and described with respect to various components, modules, etc. for exemplary purposes. It should be understood that other variations, combinations, or integrations of such elements that provide the same features, functions, etc. are included within the scope of embodiments of the invention.

The flow diagram described herein is just an example. There may be many variations to this diagram or the blocks (or operations) thereof without departing from the spirit of embodiments of the invention. For instance, the blocks may be performed in a differing order, or blocks may be added, deleted or modified. All of these variations are considered a part of the claimed invention. Furthermore, although an exemplary execution of the flow diagram blocks is described with respect to the exemplary computer system 100 and server device 102, execution of the flow diagram blocks may be implemented with other hardware and/or software architectures that provide the same features, functions, etc. in accordance with exemplary embodiments of the invention.

Exemplary embodiments of the invention can be implemented in hardware, software, or a combination of both. Those embodiments implemented in software may, for example, include firmware, resident software, microcode, etc. Exemplary embodiments of the invention may also be implemented as a computer program product accessible from a computer-usable or computer-readable medium providing program code for use by or in connection with a computer or other instruction execution system. In this regard, a computer-usable or computer-readable medium can be any apparatus that can contain, store, communicate, propagate, or transport the program for use in connection with the instruction execution system, apparatus, or device.

The computer-usable or computer-readable medium can be an electronic, magnetic, optical, electromagnetic, infrared, or semiconductor system (apparatus, device, etc.) or a propagation medium. Examples of a computer-readable medium include a semiconductor or solid state memory, magnetic tape, a removable computer diskette, a random access memory (RAM), a read-only memory (ROM), a rigid magnetic disk, or an optical disk. Some current examples of optical disks include compact disk-read only memory (CD-ROM), compact disk-read/write (CD-R/W), or digital video disk (DVD).

A data processing system suitable for storing and/or executing program code can include at least one processor coupled directly or indirectly to memory elements through a system bus. The memory elements can include local memory employed during actual execution of the program code, bulk storage, or cache memories that provide temporary storage of at least some program code to reduce the number of times the code needs to be retrieved from bulk storage during execution.

Input/output (I/O) devices (e.g., keyboards, displays, pointing devices, etc.) can be coupled to the data processing system either directly or through intervening I/O controllers. Network adapters may also be coupled to the data processing system to allow the system to be coupled to other data processing systems or remote printers or storage devices through intervening private or public networks. Telephonic modems, cable modems, and ethernet cards are a few examples of the currently available types of network adapters.

While exemplary embodiments of the invention have been described, it will be understood that those skilled in the art, both now and in the future, may make various improvements and enhancements which fall within the scope of the claims that follow. These claims should be construed to maintain the proper protection for the invention first described.

What is claimed is:

1. A method for monitoring dependent metric streams for anomalies, comprising:
    identifying a plurality of sets of dependent metric streams from a plurality of metric streams of a computer system by measuring an association of the plurality of metric streams using a statistical dependency measure analysis, wherein each set comprises a plurality of the dependent metric streams and each metric stream comprises a plurality of data;
    determining a subset of the plurality of sets of dependent metric streams to monitor by selecting a quantity of the sets of dependent metric streams that have a highest statistical dependency;
    cleaning the data of each set of dependent metric streams of the subset by identifying and removing outlier data;
    fitting a probability density function to the cleaned data of each set of dependent metric streams of the subset, wherein the probability density function is a likelihood function that provides a likelihood of an occurrence of the cleaned data;
    determining a detection threshold that is a lower threshold on the likelihood of the occurrence of the cleaned data of each set of dependent metric streams of the subset based on the likelihood function;
    detecting an anomaly if a likelihood of an occurrence of a new data of one of the sets of dependent metric streams of the subset is less than the detection threshold; and
    transmitting an alert signal in response to detecting the anomaly.

2. The method of claim 1, wherein:
    identifying a plurality of sets of dependent metric streams using a statistical dependency measure analysis comprises using a mean square contingency distance analysis and measuring the association of the data of the plurality of metric streams that is observed at a same point in time; and
    determining a subset of the plurality of sets comprises selecting the quantity of the sets of dependent metric streams that have a highest statistical dependency below an upper cutoff value, wherein the metric streams of the sets of dependent metric streams that have a statistical dependency that is equal to or greater than the upper cutoff value are based on a same or substantially similar measurement of a performance of the computer system; and
    further comprising normalizing the data of each set of dependent metric streams of the subset to per unit parameters.

3. The method of claim 1, wherein cleaning the data of each set of dependent metric streams of the subset comprises identifying and removing the outlier data using a clustering algorithm that comprises:
    searching for clusters of the data of each set of dependent metric streams of the subset by viewing the data as a graphed image and examining the image at a plurality of resolutions;
    combining the clusters according to a perceptual grouping criteria based on proximity, continuity of orientation, and density of the data; and
    determining a clustering hierarchy by identifying salient points on a curve that represents a number of clusters as a function of a degree of resolution.

4. The method of claim 1, wherein fitting a probability density function to the cleaned data of each set of dependent metric streams of the subset comprises:
    clustering the cleaned data;
    fitting a probability density function to each cluster using jittering and kernel density estimation with data-dependent bandwidths; and
    computing an overall probability density function for the entire set of cleaned data as a weighted average of the probability density functions for the different clusters.

5. The method of claim 1, wherein:
    the detection threshold is a minimum of the likelihood of the occurrence of the cleaned data of each set of dependent metric streams of the subset based on the likelihood function;
    the likelihood of the occurrence of the new data of one of the sets of dependent metric streams of the subset is computed as a bilinear interpolation of pre-computed likelihood values; and
    an alert signal is transmitted if a plurality of likelihoods of occurrences of new data of one of the sets of dependent metric streams of the subset is less than the detection threshold, indicating a detection of a persistent anomaly in accordance with a predetermined occurrence pattern.

* * * * *